United States Patent
Hong et al.

(10) Patent No.: US 10,521,474 B2
(45) Date of Patent: Dec. 31, 2019

(54) APPARATUS AND METHOD FOR WEB PAGE ACCESS

(71) Applicant: Samsung Electronics Co., Ltd., Suwon-si (KR)

(72) Inventors: Seok Jin Hong, Hwaseong-si (KR); Kyoung Gu Woo, Seoul (KR); Yo Han Roh, Hwaseong-si (KR); Sang Hyun Yoo, Seoul (KR); Ji Hyun Lee, Hwaseong-si (KR); Ho Dong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 14/696,104

(22) Filed: Apr. 24, 2015

(65) Prior Publication Data
US 2015/0317408 A1 Nov. 5, 2015

(30) Foreign Application Priority Data
Apr. 30, 2014 (KR) .................. 10-2014-0052838

(51) Int. Cl.
*G06F 17/30* (2006.01)
*G06F 16/901* (2019.01)
(Continued)

(52) U.S. Cl.
CPC ........ *G06F 16/9024* (2019.01); *G06F 16/254* (2019.01); *G06F 16/86* (2019.01);
(Continued)

(58) Field of Classification Search
CPC ........ G06F 17/30958; G06F 17/30876; G06F 17/30873; G06F 17/30563; G06F 17/2785;
(Continued)

(56) References Cited

U.S. PATENT DOCUMENTS 7,406,459 B2 * 7/2008 Chen ................ G06F 17/30864
707/954
8,200,597 B2 6/2012 Wan et al.
(Continued)

FOREIGN PATENT DOCUMENTS

CN 101000617 A 7/2007
CN 103455487 A 12/2013
(Continued)

OTHER PUBLICATIONS

Chakrabarti, Soumen, et al. "Using Memex to archive and mine community Web browsing experience." Computer Networks 33.1 (2000): 669-684. (16 pages, in English).
(Continued)

*Primary Examiner* — Greta L Robinson
(74) *Attorney, Agent, or Firm* — NSIP Law

(57) ABSTRACT

An apparatus and method for web page access and an apparatus and method for structuring a web page access history are provided. The apparatus for structuring a web page access history includes a topic extractor configured to analyze a web page accessed by a user to extract at least one topic related to the page, a mapper configured to map the at least one extracted topic onto a node of an ontology-based data structure, and a summary graph generator configured to extract a sub graph including the mapped node from the data structure, and to generate a summary graph based on the extracted sub graph.

20 Claims, 11 Drawing Sheets

(51) Int. Cl.
  *G06F 17/27* (2006.01)
  *G06F 16/84* (2019.01)
  *G06F 16/25* (2019.01)
  *G06F 16/955* (2019.01)
  *G06F 16/954* (2019.01)

(52) U.S. Cl.
  CPC .......... *G06F 16/954* (2019.01); *G06F 16/955* (2019.01); *G06F 16/9566* (2019.01); *G06F 17/2785* (2013.01)

(58) Field of Classification Search
  CPC ......... G06F 17/30917; G06F 17/30887; G06F 16/9024; G06F 16/954; G06F 16/955; G06F 16/9566; G06F 16/254; G06F 16/86
  USPC ....... 707/705, 712, 739, 740, 751, 798, 802; 715/205, 206
  See application file for complete search history.

(56) References Cited

U.S. PATENT DOCUMENTS

| | | | |
|---|---|---|---|
| 8,452,760 | B2 | 5/2013 | Yamasaki et al. |
| 8,478,774 | B2 | 7/2013 | Ariga |
| 8,880,514 | B2 | 11/2014 | Kim et al. |
| 9,189,562 | B2 | 11/2015 | Nakano et al. |
| 2005/0257400 | A1* | 11/2005 | Sommerer ........ G06F 17/30873 36/13 |
| 2008/0104061 | A1 | 5/2008 | Rezaei |
| 2009/0240650 | A1 | 9/2009 | Wang et al. |
| 2009/0240682 | A1* | 9/2009 | Balmin ............. G06F 17/30554 |
| 2010/0082673 | A1 | 4/2010 | Nakano et al. |
| 2011/0191344 | A1* | 8/2011 | Jin ........................ G06F 17/30 707/739 |
| 2011/0252329 | A1* | 10/2011 | Broman ............ G06F 17/30876 715/738 |
| 2012/0066073 | A1* | 3/2012 | Dilip .................. G06Q 30/0269 705/14.66 |
| 2012/0185466 | A1 | 7/2012 | Yamasaki et al. |
| 2013/0014823 | A1 | 1/2013 | Ko |
| 2013/0198240 | A1* | 8/2013 | Ameri-Yahia ......... G06Q 30/02 707/798 |

FOREIGN PATENT DOCUMENTS

| | | |
|---|---|---|
| JP | 2006-146627 A | 6/2006 |
| JP | 2010-86343 A | 4/2010 |
| JP | 2010-205265 A | 9/2010 |
| JP | 2013-4013 A | 1/2013 |
| KR | 10-2006-0034187 A | 4/2006 |
| KR | 10-0704508 B1 | 4/2007 |
| KR | 10-0771577 B1 | 10/2007 |
| KR | 10-2010-0056812 A | 5/2010 |
| KR | 10-2010-0077923 A | 7/2010 |
| KR | 10-2010-0100231 A | 9/2010 |
| KR | 10-2011-0086791 A | 8/2011 |
| KR | 10-2011-0087241 A | 8/2011 |
| KR | 10-1097191 B1 | 12/2011 |
| KR | 10-2012-0119885 A | 10/2012 |
| WO | WO 2011/013191 A1 | 3/2011 |

OTHER PUBLICATIONS

European Search Report dated Aug. 31, 2015 in counterpart European Application No. 151656535 (9 pages, in English).
Chinese Office Action dated Jan. 24, 2019 in corresponding Chinese Patent Application No. 201510187758.5 (14 pages in English, 9 pages in Chinese).
Japanese Office Action dated Mar. 5, 2019 in corresponding Japanese Patent Application No. 2015-092601 (3 pages in English, 2 pages in Japanese).

* cited by examiner

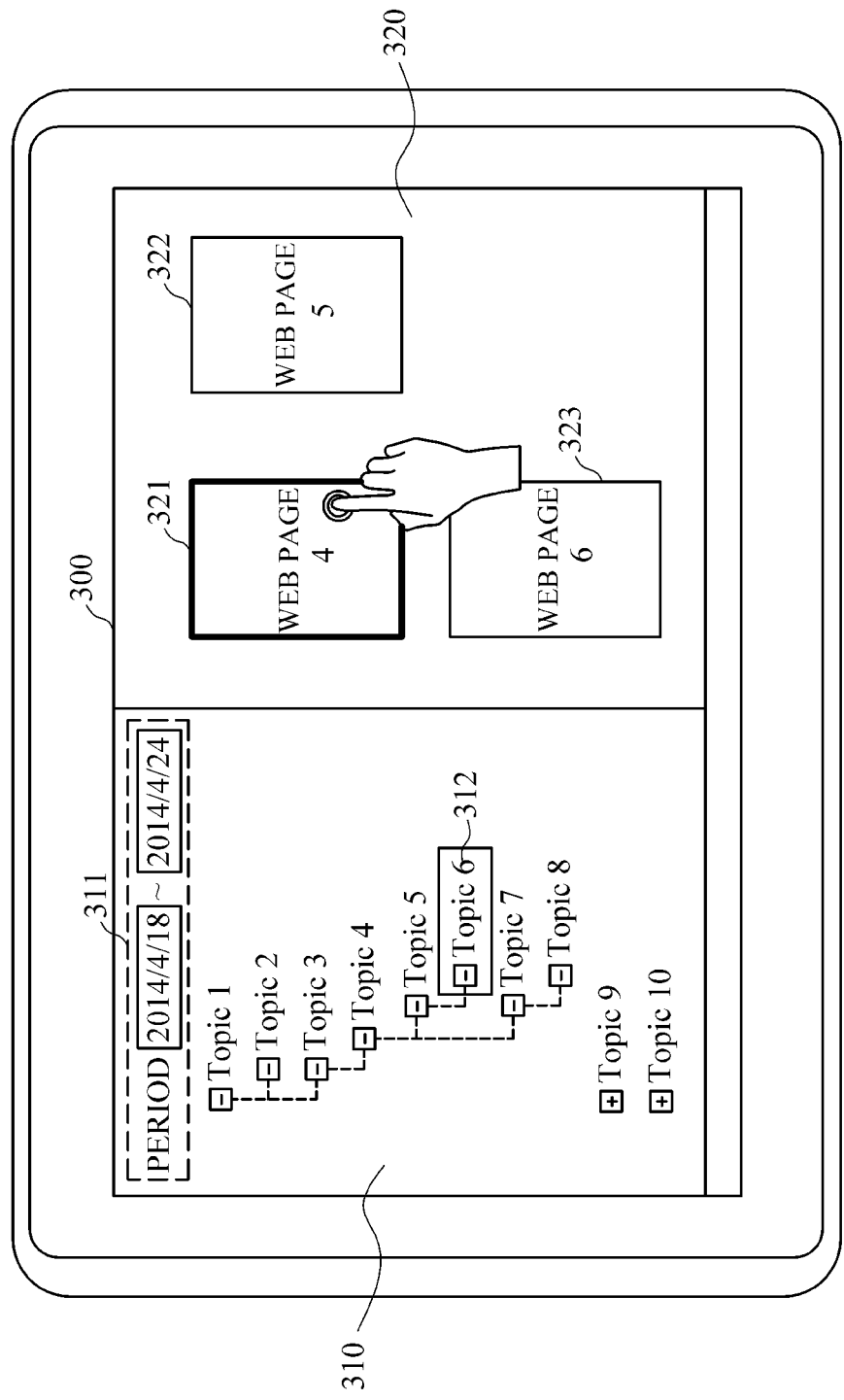

APPARATUS AND METHOD FOR WEB PAGE ACCESS

CROSS-REFERENCE TO RELATED APPLICATION(S)

This application claims the benefit under 35 USC 119(a) of Korean Patent Application No. 10-2014-0052838 filed on Apr. 30, 2014, in the Korean Intellectual Property Office, the entire disclosure of which is incorporated herein by reference for all purposes.

BACKGROUND

1. Field

The following description relates to an apparatus and method that allow a user to access to a web page based on an access history and to an apparatus and method for structuring a web page access history.

2. Description of Related Art

With the widespread use of portable smart devices, people are now able to easily search for any desired information anywhere using their smart devices.

Many users of portable smart devices search through the Internet for desired web pages, which include various types of information, through web browsers installed on the portable smart devices. When a user is searching for web pages, information included in the web pages are remembered in the user's brain; however, in the event that the user searched through too many web pages, or in the event that it has been a long time since the user looked up a web page, the user may have forgotten the acquired information or the previously-searched web page due to a memory limitation of the human brain.

Accordingly, a user may take notes of necessary details when he or she has found desired information on the Internet, or retrieve a browsing history of web pages or the like to restore previously acquired knowledge or information regarding the access to a desired web page. However, such method is inconvenient in that it takes an effort to organize information, or to restore necessary information from an unorganized record.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for structuring a web page access history include a topic extractor configured to analyze a web page accessed by a user to extract at least one topic related to the page, a mapper configured to map the at least one extracted topic onto a node of an ontology-based data structure, and a summary graph generator configured to extract a sub graph including the mapped node from the data structure and to generate a summary graph based on the extracted sub graph.

The topic extractor may be configured to extract the at least one topic from the web page by using at least one of a topic word approach, a lexical chain approach, a latent semantic analysis (LSA), a probabilistic latent semantic analysis (PLSA), and full blown Bayesian topic models.

The ontology-based data structure may be based on an ontology model generated in advance outside the apparatus.

The summary graph generator may be configured to generate the summary graph by storing information for accessing web pages, from which each topic is extracted, in each node of the sub graph onto which each topic is mapped.

The information for accessing web pages may include at least one of a uniform resource locator (URL), a uniform resource name (URN), and a thumbnail image of a web page hyperlinked to a URL or URN.

The general aspect of the apparatus may further include a session manager configured to manage the at least one web page in a session to enable the summary graph to be generated in a session.

The general aspect of the apparatus may further include an access history collector configured to collect an access history of the at least one web page.

The general aspect of the apparatus may further include a summary graph integrator configured to integrate a plurality of summary graphs to generate an integrated summary graph.

In another general aspect, a method of structuring a web page access history involves analyzing a web page accessed by a user to extract at least one topic from the web page, mapping the at least one extracted topic onto a node of an ontology-based data structure, extracting a sub graph including the node from the data structure, and generating a summary graph based on the extracted sub graph.

The extracting of the at least one topic from the web page may include extracting at least one topic from the web page by using at least one of a topic word approach, a lexical chain approach, a latent semantic analysis (LSA), a probabilistic latent semantic analysis (PLSA), and full blown Bayesian topic models.

The generating of the summary graph may include generating a summary graph by storing information for accessing the web page in the node of the sub graph.

The information for accessing the web page may include at least one of a uniform resource locator (URL), a uniform resource name (URN), and a thumbnail image of a web page hyperlinked to a URL or URN.

The general aspect of the method may further involve, prior to extracting the at least one topic from the web page, collecting an access history of the web page.

The general aspect of the method may further involve, subsequent to the generating of the summary graph, integrating the generated summary graph with other summary graph.

In another general aspect, an apparatus for structuring a web page access history includes a topic extractor configured to extract at least one topic from at least one web page accessed by a user, a semantic relations analyzer configured to analyze semantic relations between the at least one extracted topic and other extracted topic, and a summary graph generator configured to generate a summary graph based on the semantic relations.

The topic extractor may be configured to extract the at least one topic from each page by using at least one of a topic word approach, a lexical chain approach, a latent semantic analysis (LSA), a probabilistic latent semantic analysis (PLSA), and full blown Bayesian topic models.

The semantic relations analyzer may be configured to analyze semantic relations between topics based on a pre-established ontology model.

The summary graph generator may be configured to generate a semantic relations graph by matching each of the topics to nodes based on the analyzed semantic relations between topics, and by matching the semantic relations between the topics to edges that connect the nodes corresponding to each of the topics, and a summary graph by storing information for accessing web pages, from which each of the topics is extracted, in the nodes of the semantic relations graph that correspond to each of the topics.

The information for accessing the web page may include at least one of a uniform resource locator (URL), a uniform resource name (URN), and a thumbnail image of a web page hyperlinked to a URL or URN.

The general aspect of the apparatus may further include a session manager configured to manage the least one web page in a session to enable the summary graph to be generated in a session.

The general aspect of the apparatus may further include an access history collector configured to collect an access history of the at least one web page.

The general aspect of the apparatus may further include a summary graph integrator configured to integrate a plurality of summary graphs to generate an integrated summary graph.

In another general aspect, an apparatus for web page access includes a topic extractor configured to extract a topic from a web page accessed through a browser, a mapper configured to map the topic onto an ontology-based data structure, and a data structure update processor configured to update the data structure with information for accessing the web page.

The data structure update processor may include a summary graph generator configured to generate a summary graph storing the information for accessing the web page based on a portion of the data structure including the topic mapped to the data structure, and the data structure may be stored in a memory.

The general aspect of the apparatus may further include an access history retrieval processor configured to provide a user interface on a display screen for retrieving a web page access history.

The access history retrieval processor may be configured to allow a user to select a time period and to allow the user to select a web page based one or more topic related to the web page.

Other features and aspects will be apparent from the following detailed description, the drawings, and the claims.

BRIEF DESCRIPTION OF THE DRAWINGS

FIG. 3 is a block diagram illustrating an example of a user interface screen on which a summary graph is displayed.

Figure 1:
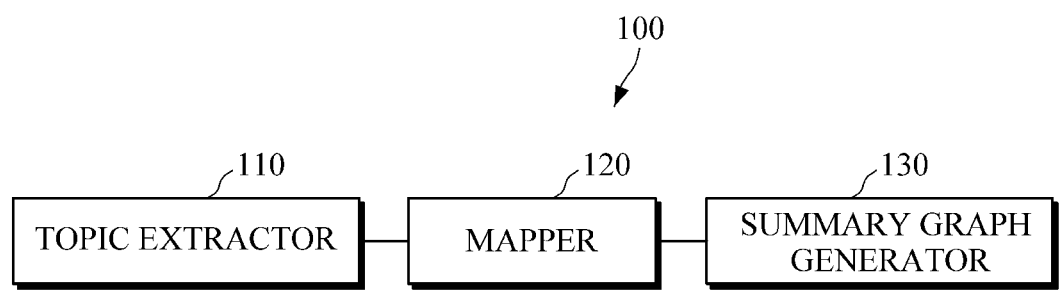
FIG. 1 is a block diagram illustrating an example of an apparatus for structuring a web page access history.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Ontology is an explicit and formal specification for conceptualizing a specific field of interest. Ontology defines a specific element using properties or relationships, and store knowledge about the element. For example, in knowledge "men are human beings", "men" and "human beings" are general concepts and are called classes, in which a class of "men" is included in a class of "human beings". Accordingly, the two classes may be described with a relationship that indicates a hierarchy between a wider class and a narrower class. Such a relationship property may be represented as "isA", and this inclusion relationship may be formed to have several hierarchies.

There are various types of properties. For example, in knowledge "exercise makes people healthy", there is a cause and effect relationship between "exercise" and "healthy", in which such relationship is commonly called "cause". In another example, if a specific concept has a specific property, as in a case of "it is hot in summer", "summer" and "hot" are related with a relationship property of "hasProperty". Such relationship property is not predetermined, and a user may define properties according to the purpose of an ontology model.

Ontology may be applied to build a data structure based on an ontology model. For example, the data structure may have a directed graph structure, and may include a plurality of nodes and edges, in which nodes may correspond to classes, and edges may correspond to relationship properties between classes.

Further, web pages refer to documents on the Internet, and in the present disclosure, both web pages and pages, which indicate the same meaning, may be used.

FIG. 1 is a block diagram illustrating an example of an apparatus for structuring a web page access history.

In this example, an apparatus 100 for structuring a web page access history is configured to summarize and structure web pages accessed by a user based on semantics. The apparatus 100 may be implemented as a fixed terminal or a mobile terminal. However, the apparatus 100 for structuring a web page access history is not limited thereto, and may be implemented as a separate apparatus to be installed in a fixed terminal or a mobile terminal.

The fixed terminal may include a digital TV, a smart TV, a desktop computer, and the like, and the mobile terminal may include a mobile phone, a smartphone, a tablet PC, a laptop computer, a digital broadcasting terminal, a personal digital assistant (PDA), a portable multimedia player (PMP), a navigation, and the like.

Referring to FIG. 1, the apparatus 100 for structuring a web page access history includes a topic extractor 110, a mapper 120 and a summary graph generator 130. The topic extractor 110, the mapper 120 and the summary graph generator 130 may be implemented as one or more processors.

The topic extractor 110 may analyze web pages accessed by a user through a web browser to extract at least one topic from each of the web pages.

For example, the topic extractor 110 may syntactically analyze text data included in web pages, and extracts a noun as a topic.

In another example, the topic extractor 110 may extract frequently appearing words as a topic.

To this end, the topic extractor 110 may use a topic word approach, a lexical chain approach, a latent semantic analysis (LSA), a probabilistic latent semantic analysis (PLSA), full blown Bayesian topic models, and the like; however, extraction methods are not limited thereto, and various topic extraction algorithms may be used.

The mapper 120 may map the topic extracted by the topic extractor 110 onto a node of a data structure based on a ontology model having a hierarchical structure of concepts. The data structure may be stored in a non-transitory computer memory.

For example, if the topic extractor 110 extracts "a camping gear" as a topic in web page 1, and extracts "a camping gear", "a sleeping bag", and "a tent" as topics in web page 2, the mapper 120 maps a topic of "camping gear" onto an ontology node corresponding to a "camping gear" class, and maps a topic of "sleeping bag" onto an ontology node corresponding to a "sleeping bag" class, and a topic of "tent" onto an ontology node corresponding to a "tent" class.

The ontology-based data structure may be provided in advance in an external server of the apparatus 100 for providing a web page access history, or may be provided in the apparatus 100 for providing a web page access history. The data structure may be based on an ontology model generated outside of the apparatus 100 for providing a web page access history.

The summary graph generator 130 may extract, from a data structure based on an ontology model, a sub graph that includes nodes onto which each topic is mapped, and may generate a summary graph based on the extracted sub graph.

As described above, an ontology-based data structure has a directed graph structure, and includes a plurality of nodes, such that the summary graph generator 130 may extract from the data structure a sub graph that includes nodes onto which each topic is mapped.

Further, the summary graph generator 130 may store information for accessing web pages, from which each topic is extracted, in each node of a sub graph to generate a summary graph.

For example, in the above case where the topic of web page 1 is a "camping gear", and topics of web page 2 are a "camping gear", a "sleeping bag", and a "tent", the summary graph generator 130 extracts, from an ontology-based data structure, a sub graph that includes a node onto which a topic of "camping gear" is mapped (hereinafter referred to as a camping gear node), a node onto which a topic of "sleeping bag" is mapped (hereinafter referred to as a sleeping bag node), and a node onto which a topic of "tent" is mapped (hereinafter referred to as a tent node). Then, the summary graph generator 130 generates a summary graph by storing information for accessing web page 1 and web page 2, from which a topic of "camping gear" is extracted, in the camping gear node of a sub graph, by storing information for accessing web page 2, from which a topic of "sleeping bag" is extracted, in the sleeping bag node of a sub graph, and by storing information for accessing web page 2, from which a topic of "tent" is extracted, in a tent node of a sub graph.

The information for accessing web pages may include, but is not limited to, a uniform resource locator (URL), a uniform resource names (URN), a thumbnail image of a web page hyperlinked to a URL, URN, or the like.

Figure 2A:
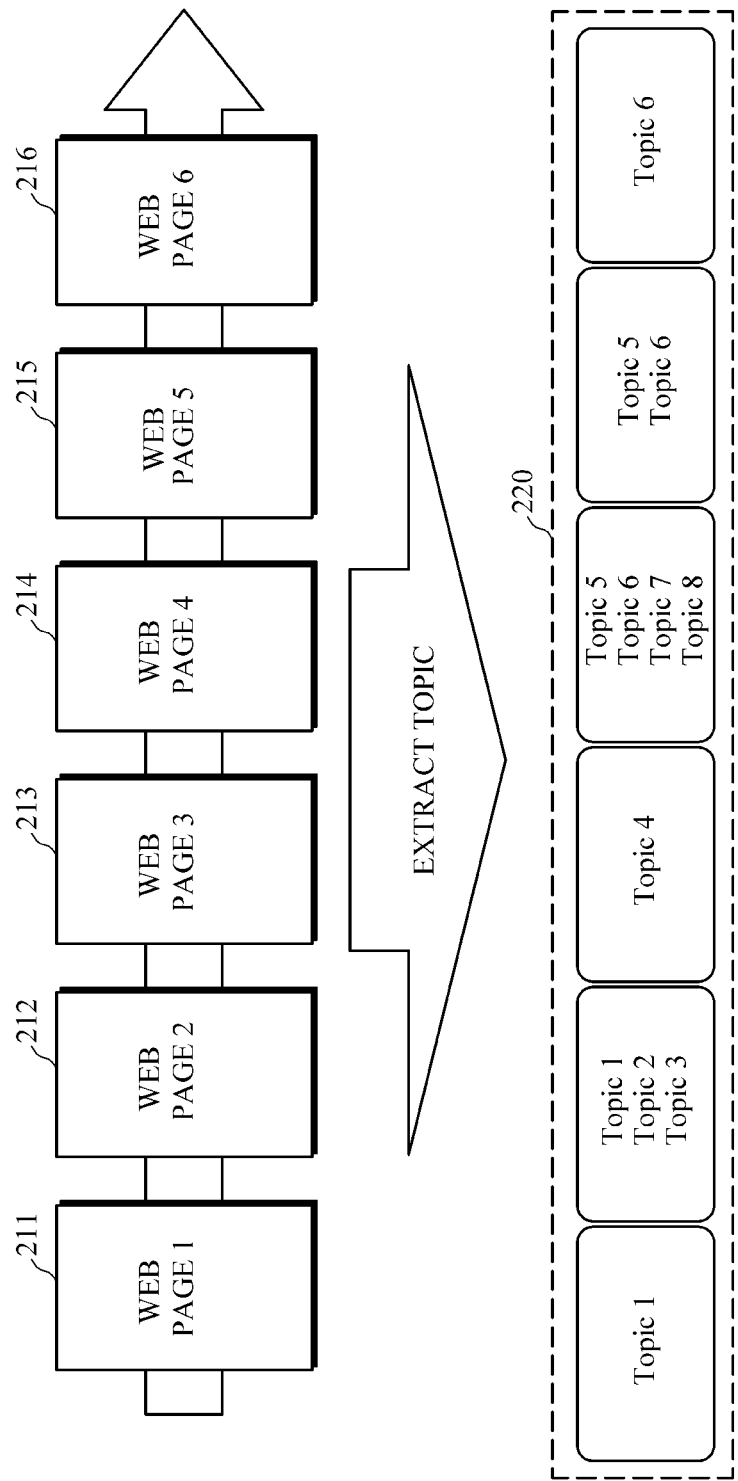
FIG. 2A is a block diagram illustrating an example of a method of extracting topics from web sites accessed by a user.
Figure 2B:
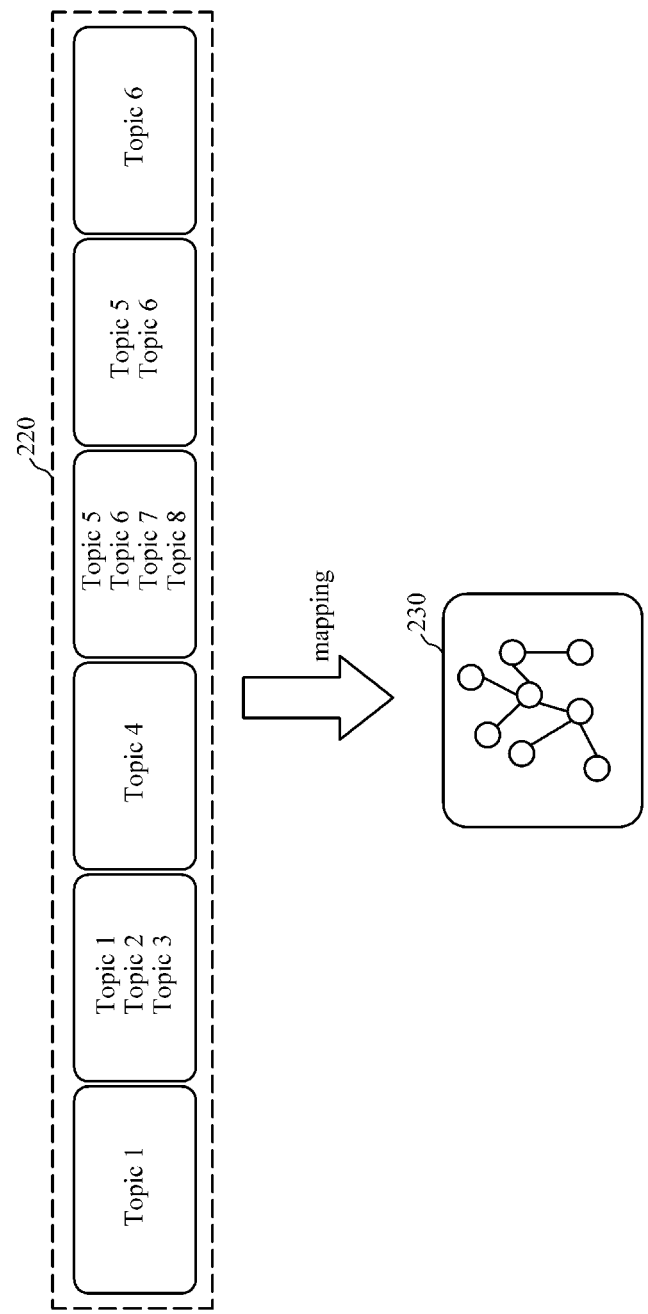
FIG. 2B is a block diagram illustrating an example of a method of mapping extracted topics onto nodes of a data structure.
Figure 2C:
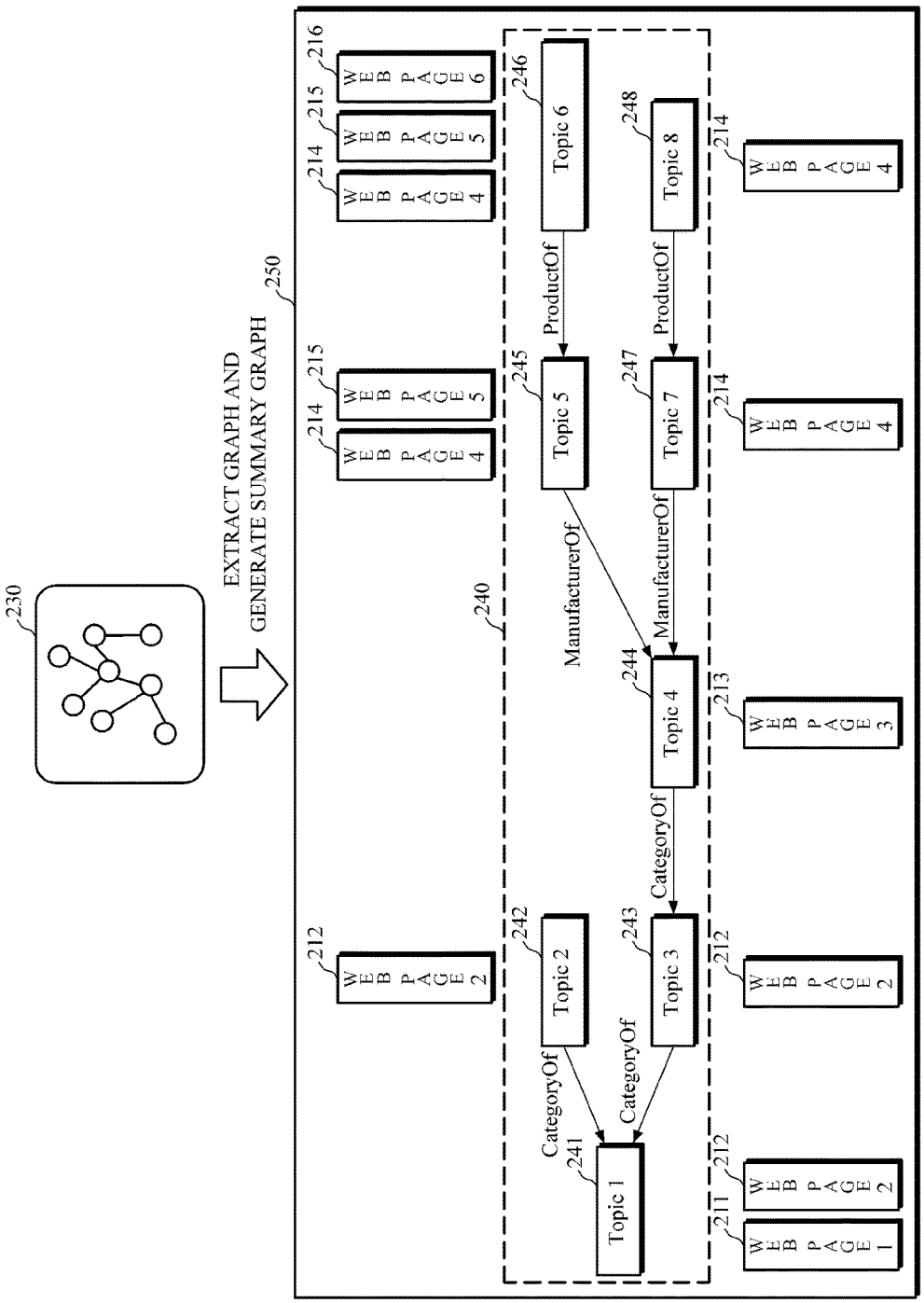
FIG. 2C is a block diagram illustrating an example of a method of extracting a sub graph from a data structure and generating a summary graph.

FIGS. 2A to 2C are diagrams to explain an example of a method of structuring a web page access history. For instance, FIG. 2A is a block diagram illustrating an example of a method of extracting topics from web sites accessed by a user. FIG. 2B is a block diagram illustrating an example of a method of mapping extracted topics onto nodes of a data structure based on an ontology model. FIG. 2C is a block diagram illustrating an example of a method of extracting a sub graph from a data structure based on an ontology model and generating a summary graph.

Referring to FIG. 2A, in response to a user accessing six web pages 211 to 216 sequentially through a web browser, the topic extractor 110 analyzes the accessed web pages 211 to 216 to extract a topic 220 from each page.

As illustrated in FIG. 2A, the topic extractor 110 analyzes web page 1 211 to extract topic 1; analyzes web page 2 212 to extract topic 1, topic 2, and topic 3; analyzes web page 3 213 to extract topic 4; analyzes web page 4 214 to extract topic 5, topic 6, topic 7, and topic 8; analyzes web page 5 215 to extract topic 5 and topic 6; and analyzes web page 6 216 to extract topic 6.

As described above, the topic extractor 110 may extract the topic by using a topic word approach, a lexical chain approach, a latent semantic analysis (LSA), a probabilistic latent semantic analysis (PLSA), full blown Bayesian topic models, and the like; however, extraction methods are not limited thereto. Various topic extraction algorithms may be used to extract topics from each page in different examples.

Referring to FIG. 2B, the mapper 120 maps the topic 220 extracted by the topic extractor 110 onto a data structure 230 based on an ontology model corresponding to each topic. The data structure 230 may be stored in a non-transitory computer memory.

The data structure 230 has a directed graph structure, and includes edges that correspond properties of relationships between classes and nodes that correspond to the classes. The data structure 230 may be provided outside or inside the apparatus 100 for structuring a web page access history.

Referring to FIG. 2C, the summary graph generator 130 extracts, from the data structure 230, a sub graph 240 that includes nodes, onto which a topic is mapped, and stores information for accessing web pages, from which each topic is extracted, in each of the nodes of a sub graph to generate a summary graph 250.

As illustrated in FIGS. 2A to 2C, the summary graph generator 130 extracts, from the data structure 230, the sub graph 240 that includes: a node 241 onto which topic 1 is mapped; a node 242 onto which topic 2 is mapped; a node 243 onto which topic 3 is mapped; a node 244 onto which topic 4 is mapped; a node 245 onto which topic 5 is mapped; a node 246 onto which topic 6 is mapped; a node 247 onto which topic 7 is mapped; and a node 248 onto which topic 8 is mapped. Similarly to the data structure 230, the sub graph 240 may include the node 230, onto which each topic is mapped, and edges that represent relationships between topics.

Further, the summary graph generator 130 generates the summary graph 250 by storing: information for accessing the web page 1 211 and the web page 2 212, from which topic 1 is extracted, in the node 241 onto which topic 1 is mapped; information for accessing the web page 2 212, from which topic 2 is extracted, in the node 242 onto which topic 2 is mapped; information for accessing the web page 2 212, from which topic 3 is extracted, in the node 243 onto which topic 3 is mapped; information for accessing the web page 3 213, from which topic 4 is extracted, in the node 244 onto which topic 4 is mapped; information for accessing the web page 4 214 and the web page 5 215, from which topic 5 is extracted, in the node 245 onto which topic 5 is mapped; information for accessing the web page 4 214, the web page 5 215, and the web page 6 216, from which topic 6 is extracted, in the node 246 onto which topic 6 is mapped; information for accessing the web page 4 214, from which topic 7 is extracted, in the node 247 onto which topic 7 is mapped; and information for accessing the web page 4 214, from which topic 8 is extracted, in the node 248 onto which topic 8 is mapped.

The information for accessing web pages may include, but is not limited to, a uniform resource locator (URL), a uniform resource name (URN), a thumbnail image of a web page hyperlinked to a URL or URN, or the like.

FIG. 3 is a block diagram illustrating an example of a user interface screen on which a summary graph is displayed.

Referring to FIG. 3, a user interface screen 300 includes a region 310 where a summary graph is displayed, and a region 320 where information stored in a node selected by a user is displayed. Further, in the region 310, a user interface 311 for setting a period of a web page access history to be retrieved is displayed.

In this example, if a retrieval period is set to be from Apr. 18, 2014 to Apr. 24, 2014, the apparatus 100 for structuring a web page access history generates a summary graph in real time using a web site access history during the period set by a user, and displays the generated summary graph in the region 310, or displays a summary graph, which has been stored after being generated based on a web site access history during a retrieval period set by a user, in the region 310.

Subsequently, once a user selects a node 312 corresponding to topic 6 in a summary graph displayed in the region 310, information stored in the node 312, i.e., thumbnail images 321 to 323 of each page hyperlinked to web pages (web page 4, web page 5, and web page 6), are displayed, which include information on topic 6 among web pages accessed by a user during the period of Apr. 18, 2014 to Apr. 24, 2014.

Once a user selects the thumbnail image 321 of web page 4 from among the thumbnail images 321 to 323, the web page 4 is displayed on the user interface screen 300 of in the region 320.

Figure 4:
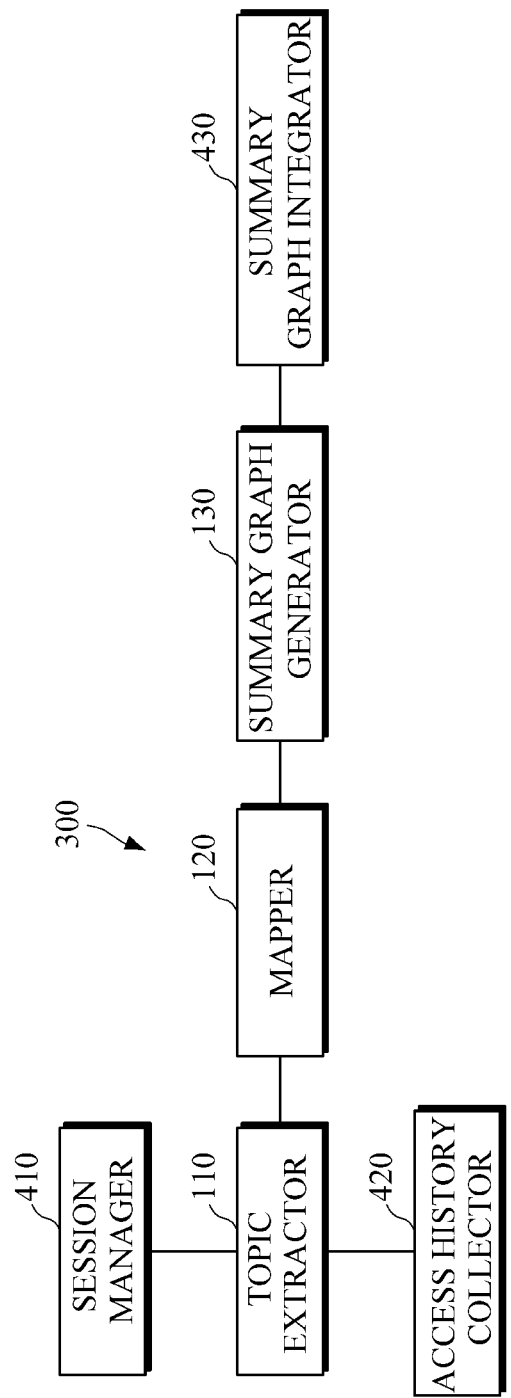
FIG. 4 is a block diagram illustrating another example of an apparatus for structuring a web page access history.

FIG. 4 is a block diagram illustrating another example of an apparatus for structuring a web page access history.

Referring to FIG. 4, an apparatus 400 for structuring a web page access history according to another example may further include a session manager 410, an access history collector 420, and a summary graph integrator 430 selectively, in addition to the apparatus 100 for structuring a web page access history. The session manager 410, the access history collector 420, and the summary graph integrator 430 may be implemented as one or more processors.

The session manager 410 may manage a bundle of web pages retrieved by a user through a web browser in a session so that a summary graph may be generated in a session. The session refers to a series of tasks of retrieving that a user performs through a web browser.

The access history collector 420 may collect a history of web pages accessed by a user through a web browser.

The summary graph integrator 430 may integrate a plurality of summary graphs.

The apparatus 400 for structuring a web page access history summarizes a web page access history based on a data structure based on an ontology model that basically has a hierarchical structure of concepts. Accordingly, with respect to topics, for which lower concepts have been retrieved, lower level nodes on the data structure are mainly included in a summary graph, but with respect to topics, for which lower concepts have not been retrieved, lower level nodes are not included in a summary graph.

Therefore, in the embodiment, the apparatus 400 for structuring a web page access history may use a summary graph to provide information indicative of hints about additional retrieval of nodes, which have not been retrieved much. For example, the apparatus 400 for structuring a web page access history may be used to retrieve in advance information about nodes that have not been retrieved much, or to collect information retrieved by other users about the nodes. To this end, the summary graph integrator 430 may collect a plurality of summary graphs to generate an integrated summary graph.

Figure 5:
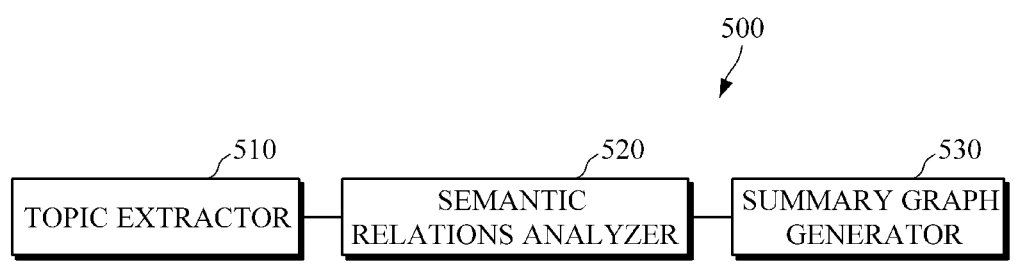
FIG. 5 is a block diagram illustrating still another example of an apparatus for structuring a web page access history.

FIG. 5 is a block diagram illustrating still another example of an apparatus for structuring a web page access history.

Referring to FIG. 5, an apparatus 500 for structuring a web page access history includes a topic extractor 510, a semantic relations analyzer 520, and a summary graph generator 530.

The topic extractor 510 may analyze web pages accessed by a user through a web browser to extract at least one topic from each page.

For example, the topic extractor 510 syntactically analyzes text data include in web pages to extract a noun as a topic.

In another example, the topic extractor 510 may extract a frequently appearing word in a web page as a topic.

To this end, the topic extractor 510 may use a topic word approach, a lexical chain approach, a latent semantic analysis (LSA), a probabilistic latent semantic analysis (PLSA), full blown Bayesian topic models, and the like; however, extraction methods not limited thereto, and various topic extraction algorithms may be used to extract topics from documents in other examples.

The semantic relations analyzer 520 may analyze semantic relations between topics extracted by the topic extractor 510 based on an ontology-based data structure. The data structure may be provided in advance in an external server of the apparatus 500 for structuring a web page access history, or may be provided in advance in the apparatus 500 for structuring a web page access history.

In an example in which the ontology-based data structure is provided in advance in an external server of the apparatus 500 for structuring a web page access history, the semantic relations analyzer 520 may communicate with the external server through a communication module of a terminal that includes the apparatus 500 for structuring a web page access history. That is, the semantic relations analyzer 520 may request the external server to analyze semantic relations between topics through a communication module of a terminal, and may receive analysis results of semantic relations between topics from the external server. In this case, upon receiving the request for analyzing semantic relations between topics, the external server analyzes semantic relations between topics based on a pre-established ontology-based data structure, and transmits analysis results to the semantic relations analyzer 520 through a communication module of a terminal.

In the embodiment, the apparatus for structuring a web page access history may further include a communicator (not shown) for communication with an external server. In this case, the semantic relations analyzer 520 communicates with an external server through a communicator of the apparatus for structuring a web page access history.

The summary graph generator 530 may generate a summary graph based on analysis results of the semantic relations analyzer 520.

The summary graph generator 530 may generate a semantic relations graph by matching each topic to nodes based on the semantic relations between topics analyzed by the semantic relations analyzer 520, and by matching the semantic relations between topics to edges that connect nodes corresponding to each topic.

The summary graph generator 530 may generate a summary graph by storing information for accessing web pages, from which each topic of nodes is extracted, in each node in a semantic relations graph, so that web pages, from which each topic is extracted, may be accessed.

The information for accessing web pages may include, but is not limited to, a uniform resource locator (URL), a uniform resource name (URN), a thumbnail image of a web page hyperlinked to a URL or URN, or the like.

Figure 6:
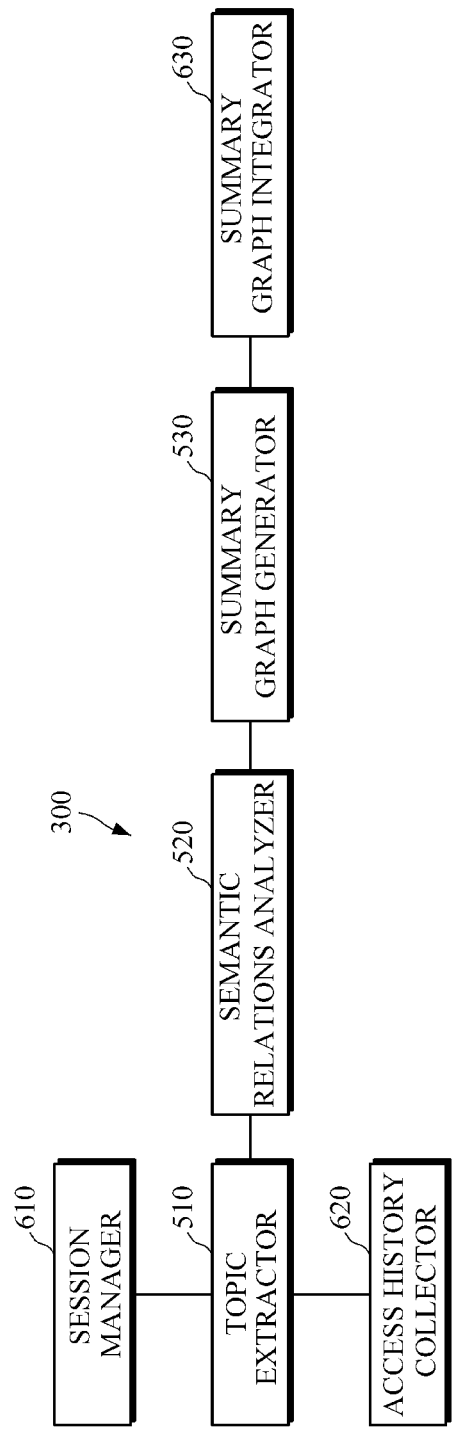
FIG. 6 is a block diagram illustrating yet another example of an apparatus for structuring a web page access history.

FIG. 6 is a block diagram illustrating yet another example of an apparatus for structuring a web page access history.

Referring to FIG. 6, an apparatus 600 for structuring a web page access history according to another embodiment may further include a session manager 610, an access history collector 620, and a summary graph integrator 630 selectively, in addition to the apparatus 500 for structuring a web page access history. The session manager 610, the access history collector 620, and the summary graph integrator 630 may be implemented as one or more processors.

The session manager 610 may manage a bundle of web pages retrieved by a user through a web browser in a session so that a summary graph may be generated in a session. The session refers to a series of tasks of retrieving that a user performs through a web browser.

The access history collector 620 may collect a history of web pages accessed by a user through a web browser.

The summary graph integrator 630 may integrate a plurality of summary graphs.

Figure 7:
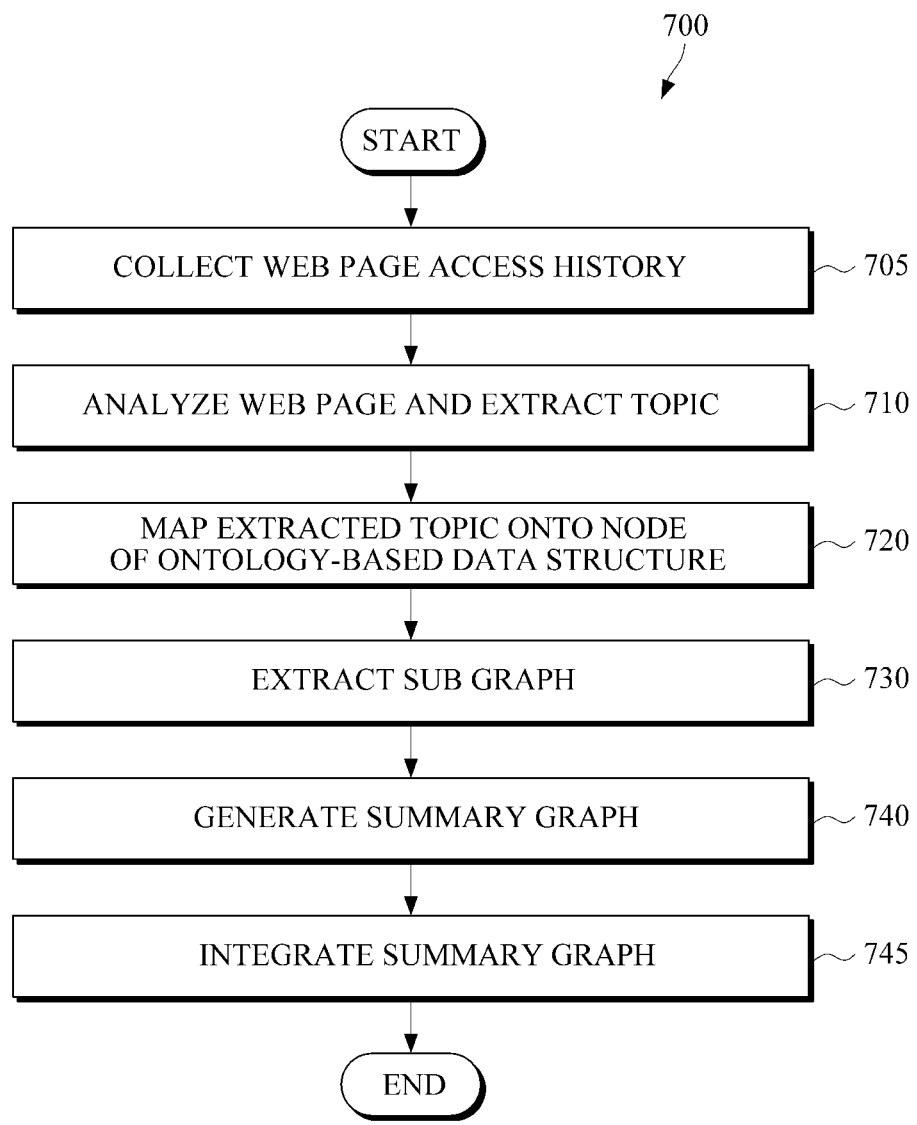
FIG. 7 is a flowchart illustrating an example of a method for structuring a web page access history.

FIG. 7 is a flowchart illustrating an example of a method for structuring a web page access history.

Referring to FIG. 7, a method 700 for structuring a web page access history according to an embodiment analyzes web pages accessed by a user to extract at least one topic from each page in 710. For example, the topic extractor 110 syntactically analyzes text data, included in web pages, to extract a noun as a topic. In another example, the topic extractor 110 may extract a frequently appearing word in a web page as a topic. To this end, the topic extractor 110 may use a topic word approach, a lexical chain approach, a latent semantic analysis (LSA), a probabilistic latent semantic analysis (PLSA), full blown Bayesian topic models, and the like, but extraction methods are not limited thereto, and various topic extraction algorithms may be used to extract topics from documents.

Subsequently, the extracted topic is mapped in 720 onto a node of a data structure based on an ontology model that has a hierarchical structure of concepts. For example, the mapper 120 may map each topic extracted by the topic extractor 110 onto a node of the data structure based on an ontology model having a hierarchical structure of concepts.

Next, a sub graph that includes nodes, onto which each topic is mapped, is extracted in 730 from the data structure. For example, the summary graph generator 130 may extract a sub graph that includes only the nodes, onto which each topic is mapped, from the data structure based on an ontology model.

Then, a summary graph is generated in 740 based on the extracted sub graph. For example, the summary graph generator 130 may generate a summary graph by storing information for accessing web pages, from which each topic extracted, in the respective nodes of a sub graph.

The information for accessing web pages may include, but is not limited to, a uniform resource locator (URL), a uniform resource name (URN), a thumbnail image of a web page hyperlinked to a URL or URN, or the like.

A summary graph may be generated in a session. The session refers to a series of tasks of retrieving that a user performs through a web browser.

According to another embodiment, a method 700 for structuring a web page access history may further include collecting a history of web pages accessed by a user through a web browser in 705.

According to another embodiment, the method 700 for structuring a web page access history may further include integrating a generated summary graph with other summary graph in 745.

Figure 8:
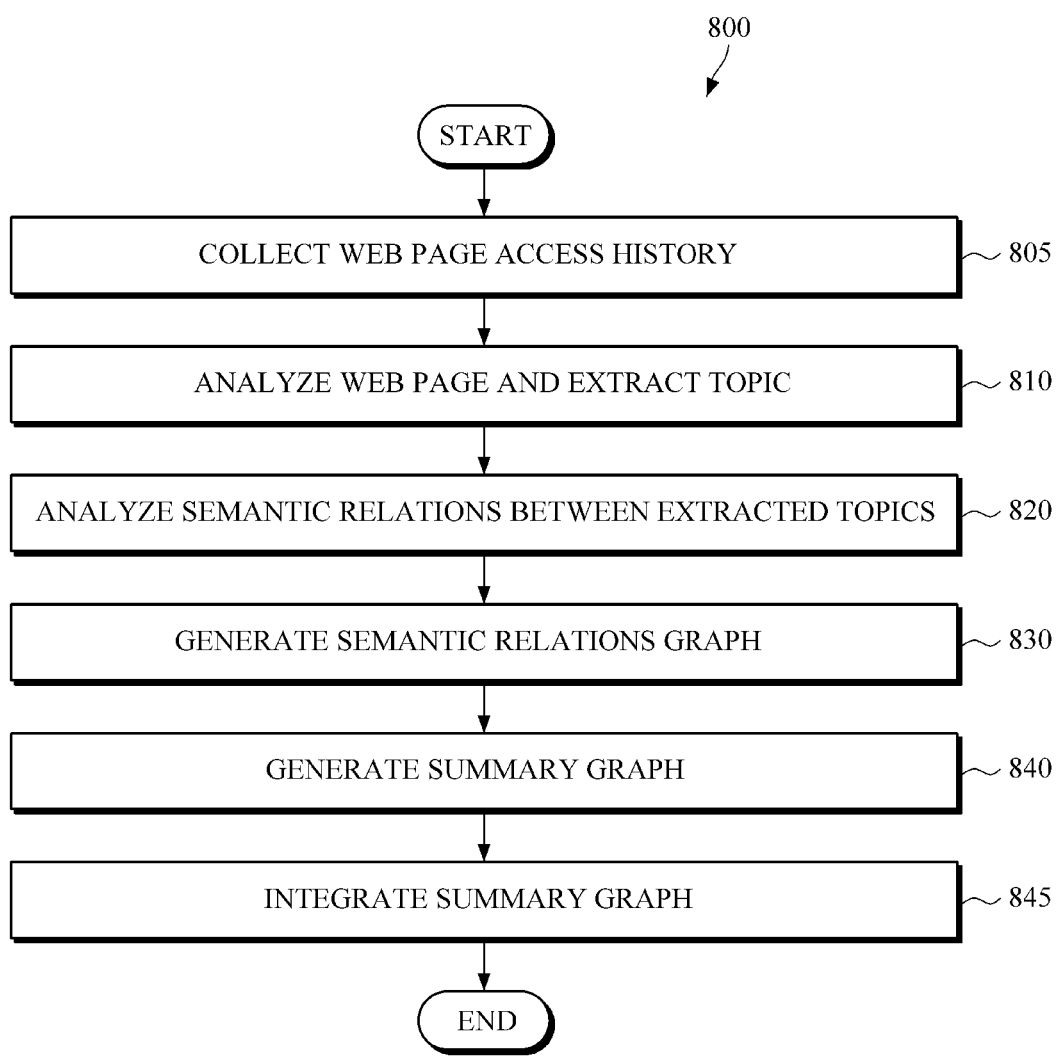
FIG. 8 is a flowchart illustrating yet another example of a method for structuring a web page access history.

FIG. 8 is a flowchart illustrating yet another example of a method for structuring a web page access history.

Referring to FIG. 8, a method 800 for structuring a web page access history according to another embodiment involves collecting web page access history of the web pages accessed by a user through a web browser in 805 and analyzing the web pages accessed by the user to extract at least one topic from each page in 810. For example, the topic extractor 510 syntactically analyzes text data included in web pages, to extract a noun as a topic. In another example, the topic extractor 510 may extract a frequently appearing word in a web page as a topic. To this end, the topic extractor 510 may use a topic word approach, a lexical chain approach, a latent semantic analysis (LSA), a probabilistic latent semantic analysis (PLSA), full blown Bayesian topic models, and the like; however, extraction methods are not limited thereto, and various topic extraction algorithms may be used to extract topics from documents in other examples.

Subsequently, semantic relations between extracted topics may be analyzed in 820 based on an ontology model that has a hierarchical structure of concepts. For example, the semantic relations analyzer 520 may analyze semantic relations between topics based on an ontology model that may be provided in advance in inside or an external server of the apparatus 500 for structuring a web page access history.

Next, a semantic relations graph is generated in 830 based on the analyzed semantic relations. For example, based on analysis results of the semantic relations analyzer 520, the summary graph generator 530 may generate a semantic relations graph by matching each topic to nodes, and by matching the semantic relations between topics to edges that connect nodes corresponding to each topic.

Then, a summary graph is generated in 840 based on the generated semantic relations graph. For example, the summary graph generator 530 may generate a summary graph by storing information for accessing web pages, from which each topic of nodes is extracted, in each node in a semantic relations graph, so that web pages, from which each topic is extracted, may be accessed.

The information for accessing web pages may include, but is not limited to, a uniform resource locator (URL), a uniform resource name (URN), a thumbnail image of a web page hyperlinked to a URL or URN, or the like.

According to another embodiment, a method 800 for structuring a web page access history may further include collecting a history of web pages accessed by a user through a web browser in 805.

According to another embodiment, the method 800 for structuring a web page access history may further include integrating a generated summary graph with other summary graph in 845.

Figure 9:
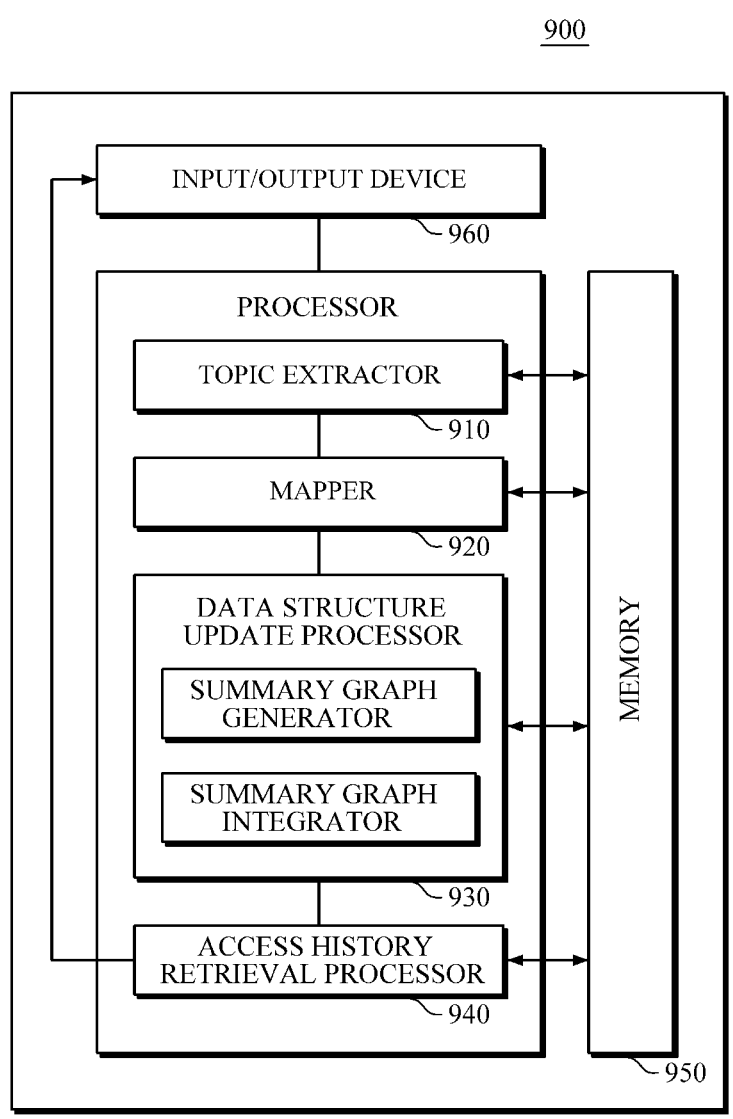
FIG. 9 is a block diagram illustrating yet another example of an apparatus for structuring a web page access history.

FIG. 9 is a block diagram illustrating another example of an apparatus for structuring a web page access history.

Referring to FIG. 9, an apparatus 900 for structuring a web page access history may be implemented as an apparatus that provides a web page access history to a user so that the user may access a web page using the web page access history. The apparatus 900 may be terminal. For example, the apparatus 900 may be a mobile terminal such as a smart phone, a laptop, tablet PC, a laptop computer, a digital broadcasting terminal, a personal digital assistant (PDA), a portable multimedia player (PMP), a navigation and the like, or a fixed terminal such as a digital TV, a smart TV, a desktop computer, and the like.

Referring to FIG. 9, the apparatus 900 includes a processor, and the processor includes topic extractor 910, mapper 920, data structure update processor 930, and access history retrival processor 940. The apparatus 900 further includes an input/output device 960 and a memory 950. The input/output device 960 allows a user to communicate with the apparatus 900. Examples of such an input/output device 960 include a display screen, a touch screen, a keyboard, a microphone and the like; however, the input/output device is not limited thereto. The input/output device 960 may display a web browser or other user interface by which a user may browse web pages.

The topic extractor 910 may analyze web pages accessed by the user to extract at least one topic from each of the web pages. For example, the topic extractor 910 may syntactically analyze text data included in web pages, and extracts a noun as a topic. In another example, the topic extractor 910 may extract frequently appearing words as a topic.

The mapper 920 may map the topic extracted by the topic extractor 910 onto a data structure based on an ontology model having a hierarchical structure of concepts. The data structure may be stored in the computer memory 950.

The data structure update processor 930 may further update the data structure. For example, the data structure update processor 930 may include a summary graph generator that generates a summary graph based on a sub graph of the data structure by storing information for accessing the web pages in the nodes of the sub graph. The summary graph integrator may integrate a plurality of summary graphs, thereby updating the data structure. While a memory 950 is illustrated in FIG. 9, it is understood that the memory may be comprised of a plurality of separate memory.

The access history retrieval processor 940 may provide a user with a user interface for retrieving a web page access history. An example of such a user interface is described with reference with FIG. 3. The description provided with reference to examples illustrated in FIGS. 1-8 applies to the apparatus 900 for structuring web page access history illustrated in FIG. 9.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for structuring a web page access history, the apparatus comprising:
   a topic extractor configured to extract topics from previously-accessed web pages;
   a mapper configured to map the topics onto respective nodes of an ontology-based data structure, wherein each node of the data structure corresponds to a respective topic and the data structure comprises a directed graph comprising edges corresponding to hierarchical relationships between the nodes; and
   a summary graph generator configured to generate, based on the data structure, a hierarchical summary graph comprising nodes that each include a topic of the extracted topics; and
   a user interface configured to display the summary graph and information for accessing the previously-accessed web pages,
   wherein the information for accessing the previously-accessed web pages comprises any one or any combination of any two or more of a hyperlink, a uniform resource locator (URL), a uniform resource name (URN), and an image hyperlinked to the URL or the URN.

2. The apparatus of claim 1, wherein the topic extractor is configured to extract the topic from the previously-accessed web page by using any one or any combination of any two or more of a topic word approach, a lexical chain approach, a latent semantic analysis (LSA), a probabilistic latent semantic analysis (PLSA), and full blown Bayesian topic models.

3. The apparatus of claim 1, wherein the ontology-based data structure is based on an ontology model generated in advance outside the apparatus.

4. The apparatus of claim 1, further comprising a session manager configured to manage the at previously-accessed web page in a session to enable the summary graph to be generated in a session.

5. The apparatus of claim 1, further comprising an access history collector configured to collect an access history of the previously-accessed web page.

6. The apparatus of claim 1, further comprising a summary graph integrator configured to integrate the summary graph and another summary graph to generate an integrated summary graph.

7. A method of structuring a web page access history, the method comprising:
extracting topics from previously-accessed web pages;
mapping the topic onto a node of an ontology-based data structure, wherein each node of the data structure corresponds to a respective topic and the data structure comprises a directed graph comprising edges corresponding to hierarchical relationships between the nodes; and
generating, based on the data structure, a hierarchical summary graph comprising nodes that each include a topic of the extracted topics; and
a user interface configured to display the summary graph and information for accessing the previously-accessed web pages,
wherein the information for accessing the previously-accessed web pages comprises any one or any combination of any two or more of a hyperlink, a uniform resource locator (URL), a uniform resource name (URN), and an image of a web page hyperlinked to the URL or the URN.

8. The method of claim 7, wherein the extracting of the topic from the previously-accessed web page comprises extracting at least one topic from the web page by using any one or any combination of any two or more of a topic word approach, a lexical chain approach, a latent semantic analysis (LSA), a probabilistic latent semantic analysis (PLSA), and full blown Bayesian topic models.

9. The method of claim 7, further comprising, prior to extracting the topic from the previously-accessed web page, collecting an access history of the previously-accessed web page.

10. The method of claim 7, further comprising, subsequent to the generating of the summary graph, integrating the generated summary graph with another summary graph.

11. An apparatus for structuring a web page access history, the apparatus comprising:
a topic extractor configured to extract topics from previously-accessed web pages;
a semantic relations analyzer configured to analyze semantic relations between the extracted topics; and
a summary graph generator configured to generate, based on the semantic relations, a summary graph comprising an ontology-based data structure including a directed graph that includes a node for each of the topics and edges corresponding to hierarchical relationships between the nodes, wherein the data structure is configured to provide information for accessing the previously-accessed web pages,
wherein the information for accessing the previously-accessed web pages comprises any one or any combination of any two or more of a hyperlink, a uniform resource locator (URL), a uniform resource name (URN), and an image hyperlinked to the URL or the URN.

12. The apparatus of claim 11, wherein the topic extractor is configured to extract the topic from previously-accessed web page by using any one or any combination of any two or more of a topic word approach, a lexical chain approach, a latent semantic analysis (LSA), a probabilistic latent semantic analysis (PLSA), and full blown Bayesian topic models.

13. The apparatus of claim 11, wherein the semantic relations analyzer is configured to analyze the semantic relations between the extracted topic and the other topic based on a pre-established ontology model.

14. The apparatus of claim 11, further comprising a session manager configured to manage the previously-accessed web page in a session to enable the summary graph to be generated in a session.

15. The apparatus of claim 11, further comprising an access history collector configured to collect an access history of the previously-accessed web page.

16. The apparatus of claim 11, further comprising a summary graph integrator configured to integrate the summary graph and another summary graph to generate an integrated summary graph.

17. An apparatus for web page access, the apparatus comprising:
a topic extractor configured to extract topics from previously-accessed web pages;
a mapper configured to map the topics onto respective nodes of an ontology-based data structure, wherein each node of the data structure corresponds to a respective topic and the data structure comprises a directed graph comprising edges corresponding to hierarchical relationships between the nodes; and
a summary graph generator configured to generate, based on the data structure, a hierarchical summary graph comprising nodes that each include a topic of the extracted topics; and
a user interface configured to display the summary graph and information for accessing the previously-accessed web pages,
a data structure update processor configured to update, based on the generated summary graph, the data structure with information for accessing the previously-accessed web pages,
wherein the information for accessing the previously-accessed web pages comprises any one or any combination of any two or more of a hyperlink, a uniform resource locator (URL), a uniform resource name (URN), and an image hyperlinked to the URL or the URN.

18. The apparatus of claim 17, wherein the summary graph generator is further configured to store the data structure in a memory.

19. The apparatus of claim 18, wherein the apparatus further comprises an access history retrieval processor configured to provide the summary graph, the node, and the information on a user interface on a display screen.

20. The apparatus of claim 19, wherein the access history retrieval processor is configured to allow a user to select a time period and to allow the user to select a web page based one or more topics related to the web page.

\* \* \* \* \*